Sept. 28, 1926.  J. A. KITTILSEN  1,600,985
ELEVATOR CUP
Filed Dec. 16, 1925
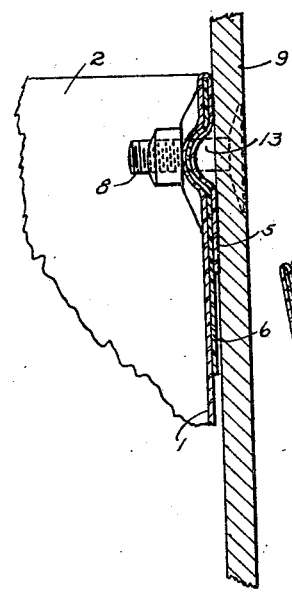
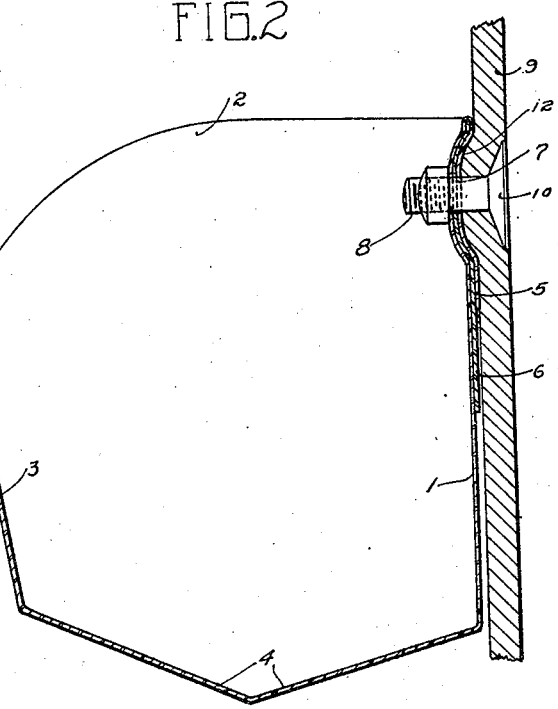
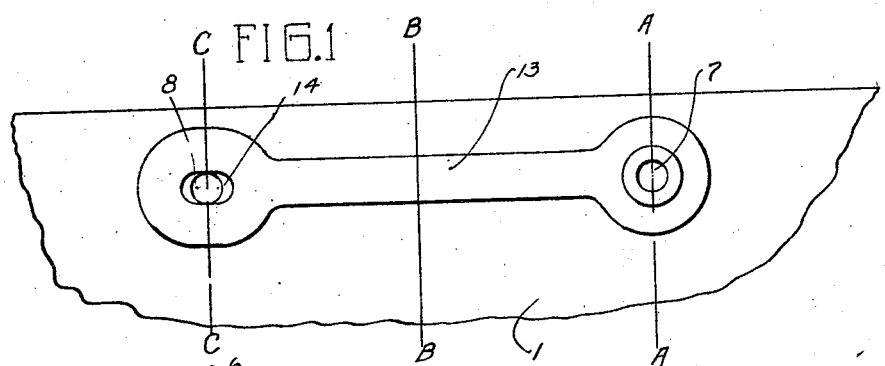
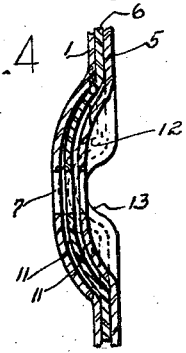
INVENTOR
John A. Kittilsen
BY
ATTORNEY Patented Sept. 28, 1926.

1,600,985

UNITED STATES PATENT OFFICE.

JOHN A. KITTILSEN, OF MOLINE, ILLINOIS, ASSIGNOR TO K. I. WILLIS CORPORATION, OF MOLINE, ILLINOIS, A CORPORATION OF ILLINOIS.

ELEVATOR CUP.

Application filed December 16, 1925. Serial No. 75,760.

My invention relates to cups or buckets which are adaptable for use in elevators for conveying granular materials such as grain etc., but more especially to the manner in which such cups or buckets are secured to the conveying belt.

The usual method for attaching the cups or buckets to the elevator belt is with their backs against the belt and rivets or bolts passing through the back sheet of the cup or bucket and through the belt. The ordinary method of accomplishing this, results in the head of the rivet or bolt coming in contact with pulleys of the elevating mechanism thereby reducing the friction surface effective between the belt and the pulley. In addition to this, however, there exists the more serious objection in the use of bolts to secure the cups or buckets to the belt exemplified by the bolts loosening up and often allowing the cups or buckets to fall into the machinery. The loosening of a cup or bucket reduces the effective capacity of the elevator to a considerable extent. Riveting the cups or buckets to the belt results in considerable additional expense in connection with repairs or the replacement of worn buckets. Until the present disclosure came into practical use through my invention various methods for securing the cups or buckets to the belt were in effect. Leather washers placed beneath the bolt nut and the metallic back of the cup or buckets constituted a common method of securing the nut against loosening. This leather soon rots away allowing the bolt to loosen. Disintegrating elements contained in the material handled attacks the washer and the body of the bolt causing further weakening of the construction; the leather serving to retain the disintegrating element around the body of the bolt. Steel lock washers are used; however, these produce added expense.

The principal objects of the present invention may be said to comprise the following:

First: To produce an elevating cup or bucket construction which permits the head of the attaching bolt to be drawn below the contact surface of the elevating belt.

Second: To produce an elevating cup or bucket construction which permits the locking of the nut without the expensive use of lock washers or the unsatisfactory use of leather or fabric washers.

Third: To produce a cup or bucket construction which incorporates the bolt nut locking means without additional expensive operations or auxiliary elements.

With these objects in view my invention consists in the novel features and advantages of construction and the arrangement of parts which will be more fully understood from the following specifications, reference being had to the accompanying drawings, in which:—

Fig. 1 is a view of the back sheet of the cup taken from the inside of same and with the major portion of the cup broken away.

Fig. 2 is a view taken transversely of the cup on the line "A A" of Fig. 1.

Fig. 3 is a transverse view of the cup on the line "B B" of Fig. 1, with the portion of the cup broken away.

Fig. 4 is an enlarged detail of the cup back plate on the line "C C" of Fig. 1, the major portion of the cup being broken away.

It is intended that a practical embodiment of my invention be disclosed in the accompanying drawings, forming a part of this specification in which similar numerals of reference indicate corresponding parts thruout the several views.

Referring to Fig. 2 the cup is shown in transverse section and comprises a back wall 1, end wall 2, front wall 3 and bottom 4. The back wall 1, consists of three or more thicknesses of metal. The back wall sheet is folded over forming a reinforcing 5, and including between it and the main back sheet, the reinforcing sheet 6. Holes 7, are formed in the several thicknesses of metal to receive the bolt 8, intended to secure the cup to the belt 9. The bolt 8 has a comparatively large countersunk head 10 in order to permit its being drawn below the contact surface of the belt 9.

In the ordinary manner of fastening the cups to the belt where the cup is provided with a flat back the holding bolt is placed in direct shear. However, since the belt material possesses a much lower shearing strength than the steel bolt the belt material gives up, tears around the bolt hole therethru and results in the bucket being loosened. Referring to the drawings it is seen that the reinforced back of the cup or bucket is depressed at 12 around the bolt hole 7. The drawing up of the bolt therefore forces the belt material into this depression resulting in a secure and enlarged area of the belt material being placed in shear. Subsequent tearing of the belt material is thus avoided and a much stronger connection between the cup or bucket and the belt is obtained.

Referring to the sectional view 4 it is disclosed that the respective sheets of metal forming the back of the cup or bucket do not touch but have a small void 11 between them. When, however, the bolt 10 is inserted in the hole and the bucket secured to the belt 9 the drawing up on the nut of the bolt serves to draw the several sheet sections of the back together in the immediate vicinity of the bolt. This drawing up of the bolt produces a tension due to the resiliency of the steel which tends to hold the nut against turning except when force is applied.

The depression 12 around the bolt hole 7 also serves to further reinforce the back sheet of the cup or bucket and serves to eliminate the constant bending of the metal diametrically across the bolt hole and the consequent failure of the bucket or cup at this point. Since the depression in the back sheet is made from the back side there is a corresponding raised portion on the inward side of the back sheet. Further strengthening of the cup or bucket is obtained by connecting the raised portions together by a longitudinal rib 13 as shown in Fig. 1, and in the sectional views of Fig 3 and Fig. 4.

Oftentimes it is advantageous to provide for irregularity in spacing of the holes in the belt of the elevator. This feature is compensated for by the use of an oblong hole as indicated by the numeral 14 in Fig. 1, instead of the ordinary circular hole 7.

While I have shown and described but a single embodiment of my invention, it is thought that various other structural modifications may be effected within the spirit and scope of the same and I intend that only such limitations be imposed as may be indicated in the appended claims, in which it is my intention to claim all novelty inherent in my invention as broadly as possible in view of the prior art.

What I claim as new and desire to secure by Letters Patent is:

1. In an elevator cup comprising side walls, a back wall and bottom, said back wall composed of a plurality of metallic sheets near the top edge thereof, holes formed therethrough, concentric depressions formed about said holes and a rib formed between adjacent holes in said back wall, said rib terminating at the edge of the concentric depressions therein.

2. In an elevator cup comprising side walls, a back wall and bottom, said back wall sheet extended and folded back in the form of a lap, a second sheet secured between said fold, holes formed through said fold and second sheet, concentric depressions produced about said holes and a rib formed between adjacent holes in said back wall, said rib terminating at the edge of the concentric depressions therein.

3. In an elevator cup comprising side walls, front wall, back wall and a bottom, said back wall composed of a plurality of metal sheets near its top edge, holes therethrough adapted to receive bolts for securing said cup to a belt, depressions surrounding said holes and adapted to receive the compressed portion of said belt about said holes and a rib formed between adjacent depressions surrounding said holes, said rib terminating at the edge of said depressions for the purpose of reenforcing said back wall.

4. In an elevator cup comprising side, front and back walls and a bottom, said back wall composed of a plurality of steel laminations, bolt holes therethrough, a depression concentric with each hole, a rib formed between adjacent depressions concentric with said holes and terminating at the edge of said depressions, said depressed portion of each lamination separated from the adjacent lamination for the purpose substantially as described.

In testimony whereof, I hereunto affix my signature.

JOHN A. KITTILSEN.